(No Model.) 2 Sheets—Sheet 2.

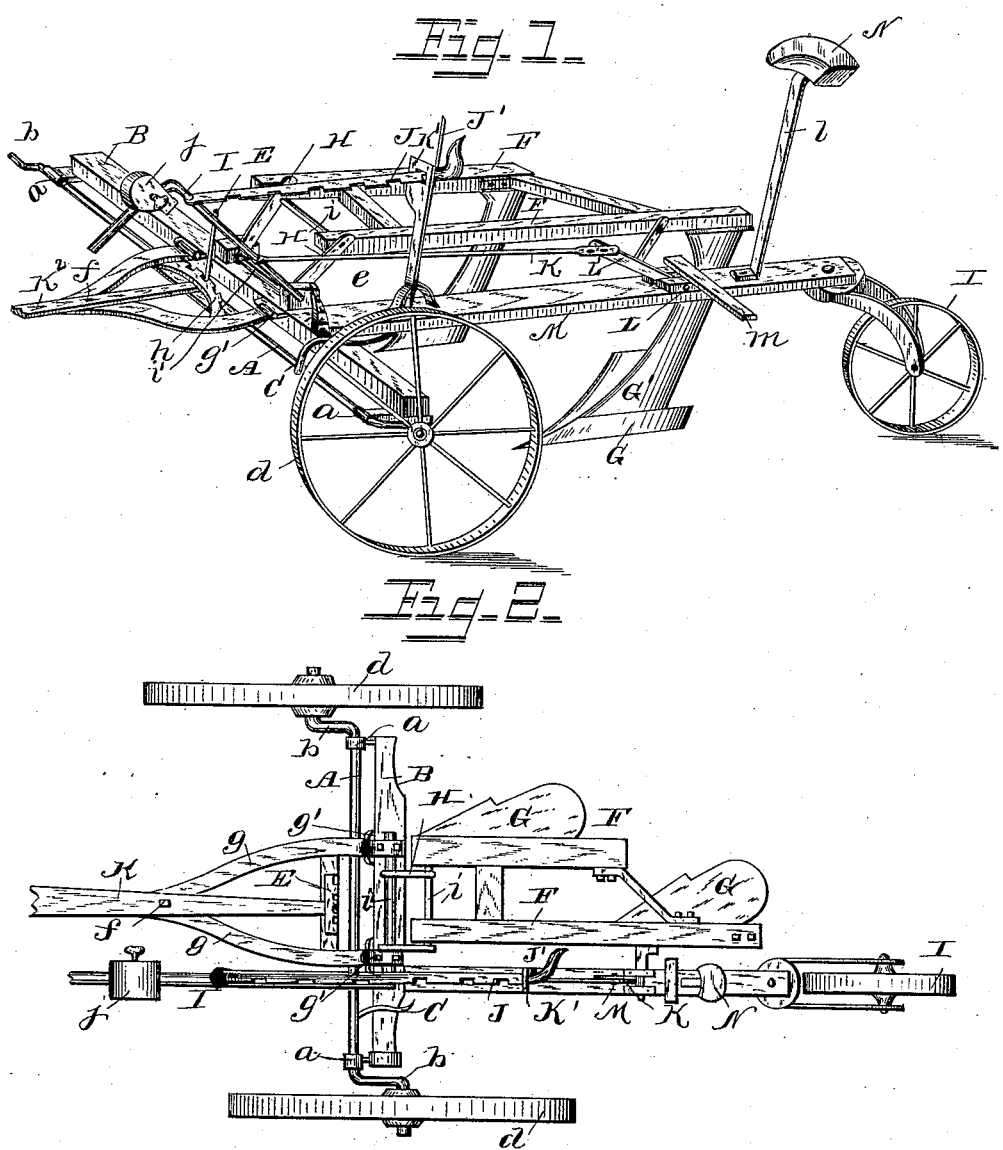

J. INGHAM.
GANG PLOW.

No. 322,825. Patented July 21, 1885.

WITNESSES
C. J. Schneider
Thos. McGill

INVENTOR
Joseph Ingham
By Myers & Co.
ATTORNEYS

N. PETERS, Photo-Lithographer, Washington, D. C.

UNITED STATES PATENT OFFICE.

JOSEPH INGHAM, OF SAN JOSÉ, CALIFORNIA.

GANG-PLOW.

SPECIFICATION forming part of Letters Patent No. 322,825, dated July 21, 1885.

Application filed October 3, 1884. (No model.)

*To all whom it may concern:*

Be it known that I, JOSEPH INGHAM, a citizen of the United States of America, residing at San José, in the county of Santa Clara and State of California, have invented certain new and useful Improvements in Gang-Plows, of which the following is a specification, reference being had therein to the accompanying drawings.

This invention pertains to improvements in gang-plows, having for its object, among other things, to effect the ready adjustment of the plows; to gage the depth of plowing, and to vary the width of the furrows; to equalize the weight of the plows and beams; to hold the latter in a level position; to readily guide and secure the plow-standard supporting-frame in its normal working position, and to prevent the binding of said frame; allowing the tongue to have a flexible connection with the frame; and the invention, to these ends, consists of the sundry combinations of parts, substantially as hereinafter fully set forth and claimed.

Figure 3:
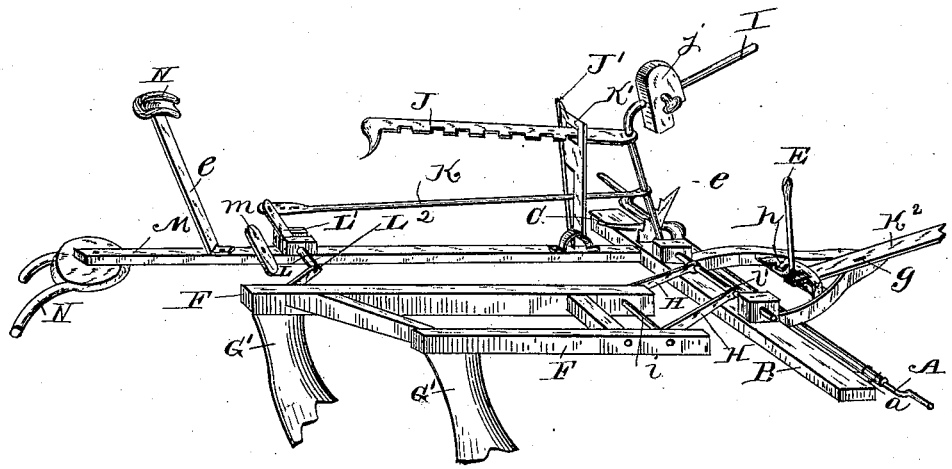
Figure 4:
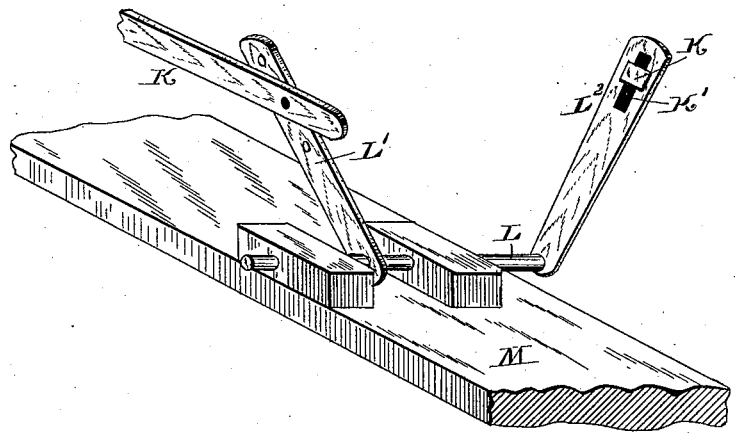

In the accompanying drawings, Figure 1 is a perspective view of my improved gang-plow with the plows elevated and one of the forward wheels removed. Fig. 2 is a plan view thereof. Fig. 3 is a rear perspective view of the same with the plows lowered into their normal working position and with parts removed. Fig. 4 is a detailed perspective view thereof.

In the embodiment of my invention, I employ an axle, A, which is supported or pivoted in eyes or bearings of plates or keepers $a$, fitted upon and bolted to a bed-piece, B. Said axle is formed at its ends with crank-arms $b$ extending in directly opposite directions from the axle and bearing-wheels $d$, whereby it is obvious that, should the ground be hilly or inclined or such that one wheel would be caused to travel in a lower or higher plane than the other, the axle can be so adjusted (as presently seen) that the axle bed-piece can maintain its normal horizontal plane, to retain the adjunctive parts thereof—as, for instance, the plow-standard beams—in a level working position. To effect the aforesaid adjustment of the axle, a lever, C, is affixed to the axle at one end and extended rearwardly, and caused to engage with a rack or toothed bar, $e$, secured to the axle bed-piece B, the operation of which lever is obvious.

K is the tongue which is pivoted or fulcrumed at $f$ upon the supporting braces or frame $g$, pivoted or hinged at $g'$ to the axle bed-piece B, to the extreme rear or inner end of which tongue is connected a lever, E, which engages with a curved or arched rack or toothed bar, $h$, fastened upon a cross-piece of the frame or braces $g$, whereby, by actuating said lever, the tongue is deflected, which, it is obvious, will cause the machine to run on or off land, and thereby cut a wider or narrower furrow.

F F are the plow-standard supporting-beams with their rear and forward ends firmly united, as shown, or otherwise, one being longer than the other, to permit the connection thereto of the plow-standards G', carrying the plows G, one in a plane in rear of the other, the purpose of which is apparent. The forward connecting-rod, $i$, of the plow-standard beams F serves as a pivotal connection therewith of the crank-arms H, the opposite ends of which arms are firmly connected to the horizontal rock-shaft $i'$, of a crank-lever, I, pivoted in eyes or blocks bolted or fastened upon the axle bed-piece B. The forward longer arm of said lever I has adjustably connected thereto a counterbalancing-weight, $j$, to counterbalance or equalize the weight and pressure of the beams, the plows and their standards. The lever I is connected by a rod, K, to one arm, L', of a second crank-shaft, L, supported in eyes or blocks secured to a frame-bar, M, the forward end of which frame-bar is fastened to the axle bed-piece B, while its rear end is supported upon a disk or plate secured between the upper ends of side bars connected to the axle of a caster-wheel, I'. The other arm $L^2$ of the crank-shaft L is connected to one of the rigidly-connected beams F by means of a bolt, $k$, passed through a slot, $k'$, of said arm $L^2$, and entering said beam, as most clearly seen in Fig. 4, which slot permits of the beam, at its connection with said lever through said bolt, having a limited independent movement to enable the rear ends of the beams to rise and fall in harmony with their forward ends in effecting the adjustment of the plows, as hereinafter explained.

J is a rack bar or lever with its forward end connected to the longer arm of lever I near its upper end, said rack-bar passing through and engaging an apertured standard or upright, K', fastened upon the frame-bar M. The rear end of the lever or bar J is curved or bent laterally to adapt it to be conveniently actuated by the foot of the driver when raising the plows, and by the hand of the driver when lowering the plows. The driver occupies the seat N, secured or mounted upon the standard l, fastened at its lower end to the frame-bar M, in rear of and so as to enable him to have the plows always in view for their more efficient control.

The foot lever or bar J is caused to automatically engage with and is held in contact with the edge of the bar or upright K' by the action of a straight upright spring-bar, J', whose lower end is secured to the board M, while near its upper end it presses against said foot lever or bar.

Secured to the frame-bar M contiguously to the seat-standard is a foot-piece, m.

The caster-wheel I' is to effect the guiding of the machine in its normal working position.

It will be seen that by pressing with the foot forwardly upon the lever or bar J the crank-levers I L, together with the rod K, connecting said levers, will be so actuated as to effect the lifting or elevation of the plows out of contact with the ground, as is desirable in moving the machine from place to place when out of operation. The reverse movement of said lever (by use of the hand) has the opposite effect—the lowering of the plows for service.

Having thus fully described my invention, what I claim, and desire to secure by Letters Patent, is—

1. In a gang-plow, the supporting-beams F, rod i, arms H H, rock-shaft i', lever I, and rack-bar J, substantially as shown and described.

2. The combination of the lever I, rack-bar J, upright K', spring-bar J', rod K, arm L', crank-shaft L, arm L², and bolt k, for connection with the supporting-beams, substantially as shown and described.

In testimony whereof I affix my signature in presence of two witnesses.

JOSEPH INGHAM.

Witnesses:
C. C. REDMOND,
C. B. GIFFORD.